Oct. 16, 1951 W. R. SPILLER ET AL 2,571,303
DRIVE RELEASE AND BRAKE FOR STITCHING MACHINES
Original Filed May 31, 1943 3 Sheets-Sheet 1
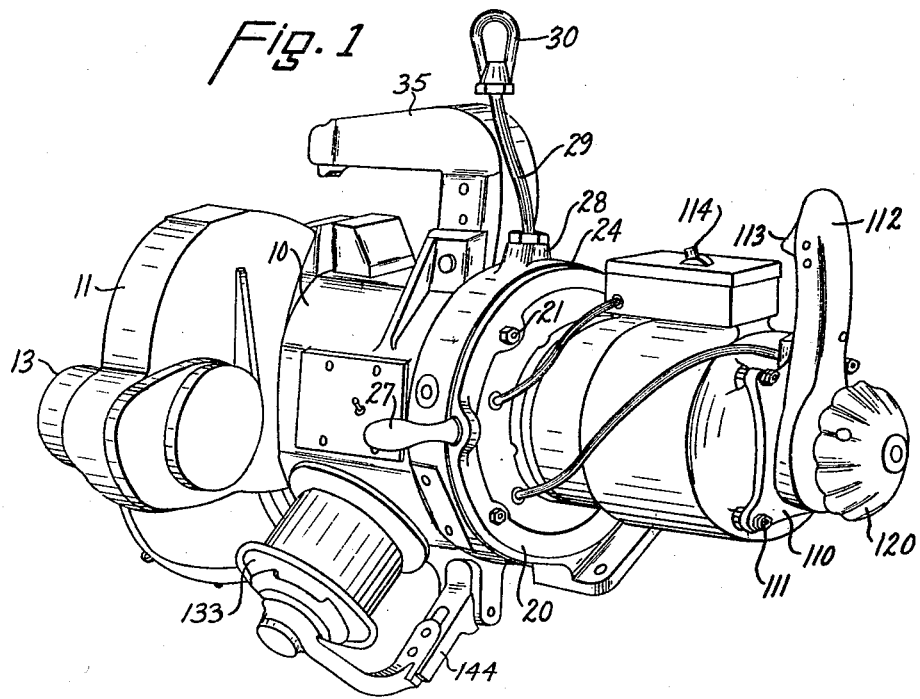
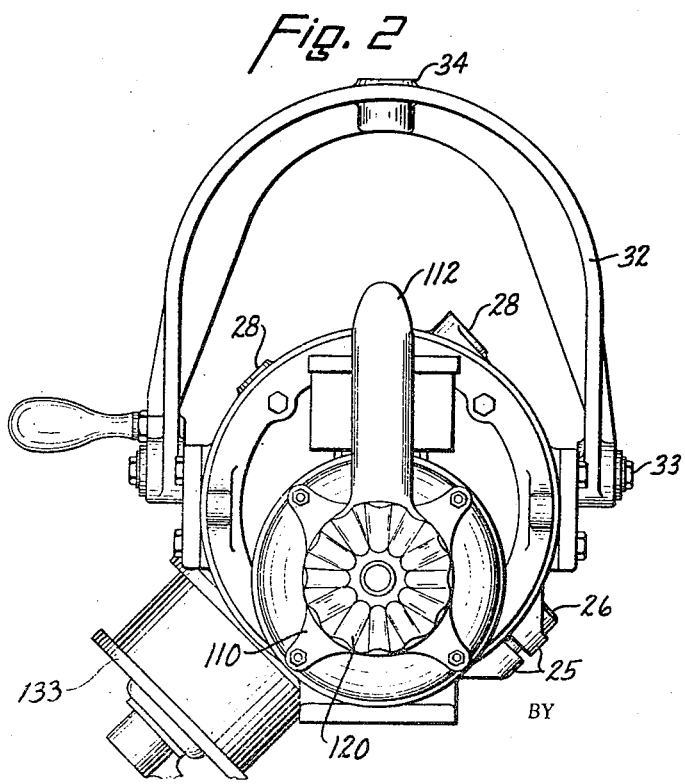
INVENTORS
William R. Spiller and
Leo D. Barley
BY Marechal D. Biebel
ATTORNEYS

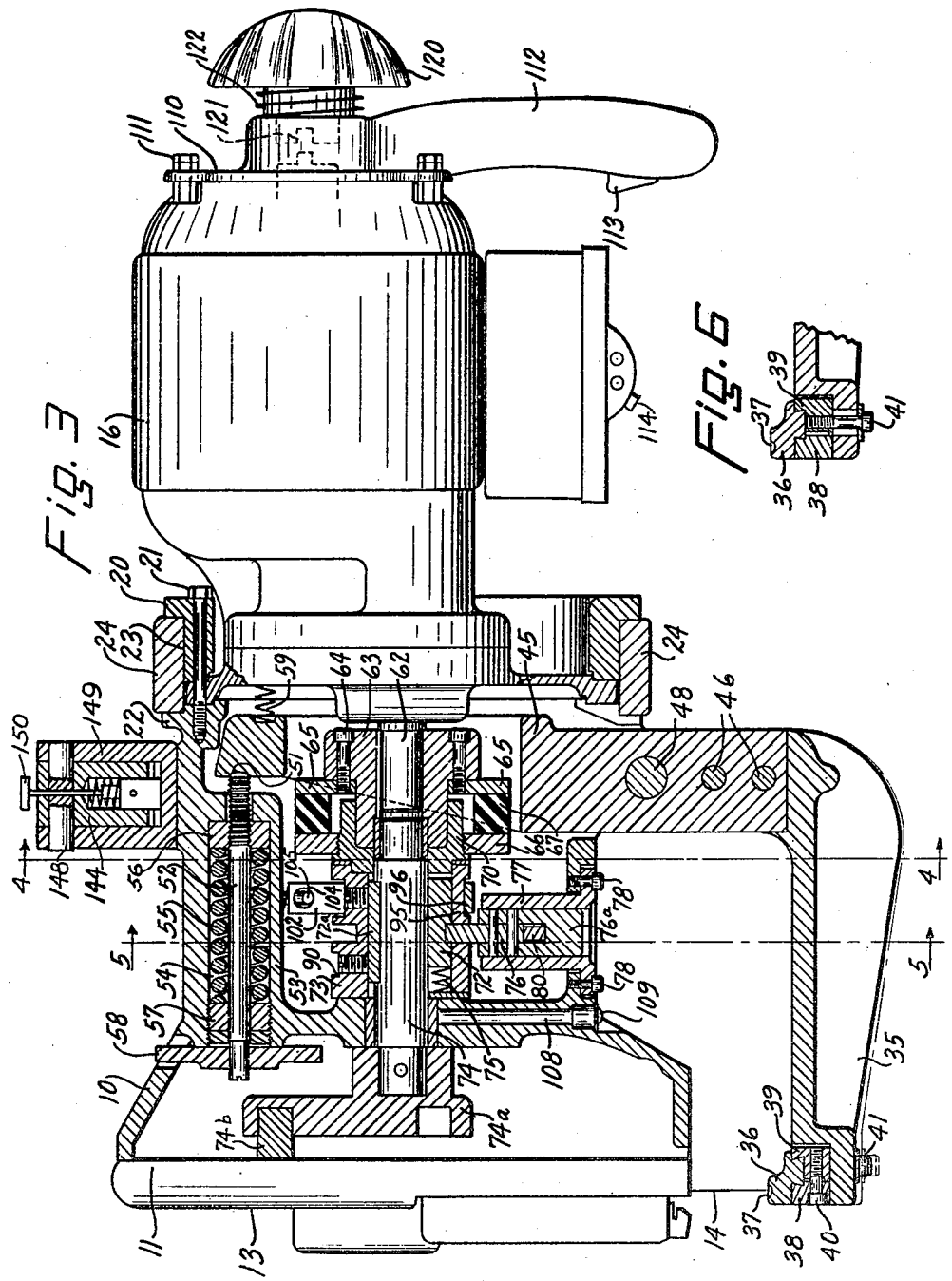

Oct. 16, 1951 W. R. SPILLER ET AL 2,571,303
DRIVE RELEASE AND BRAKE FOR STITCHING MACHINES
Original Filed May 31, 1943 3 Sheets-Sheet 3
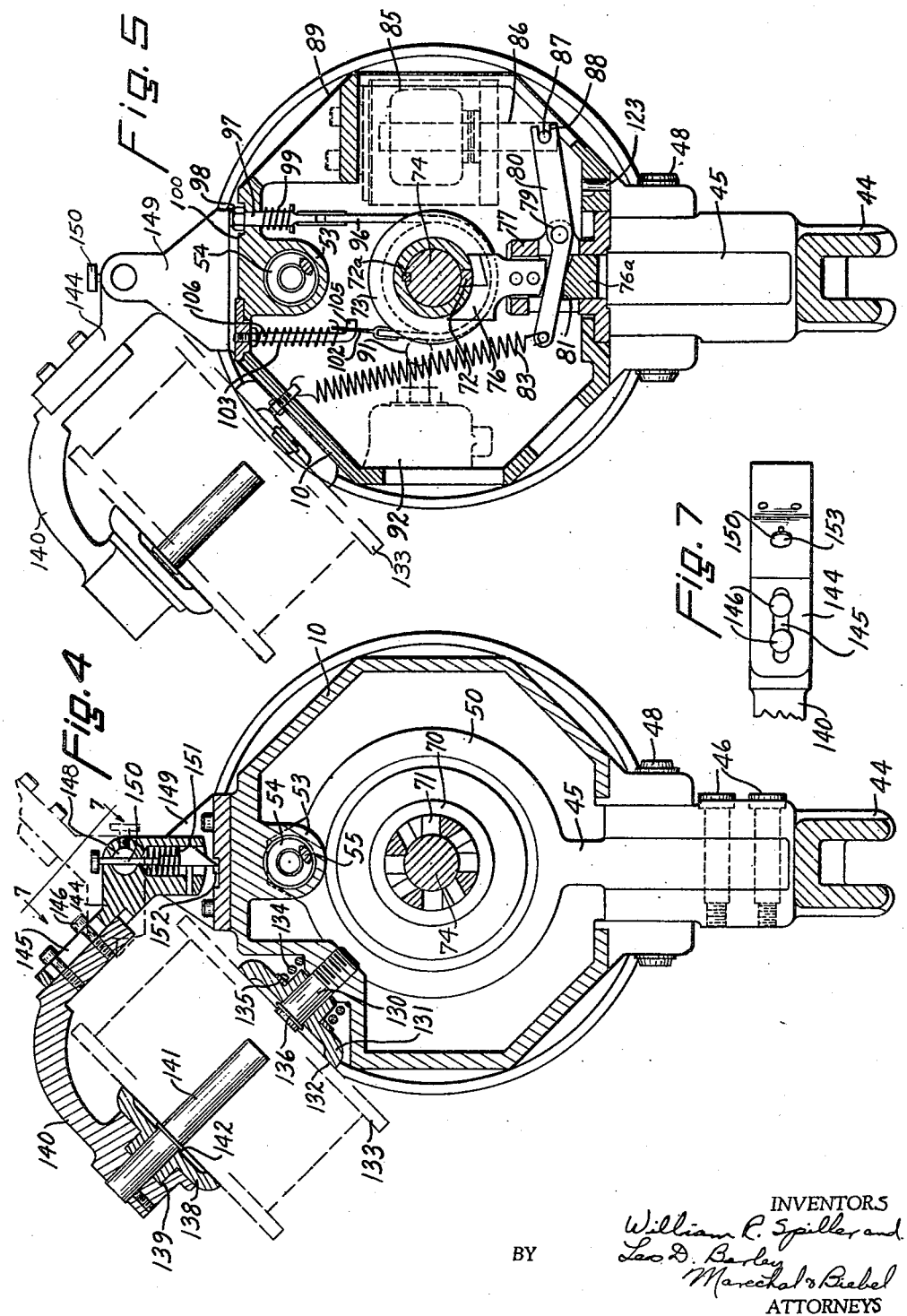
INVENTORS
William R. Spiller and
Leo D. Barley
BY Marechal & Biebel
ATTORNEYS

Patented Oct. 16, 1951

2,571,303

UNITED STATES PATENT OFFICE

2,571,303

DRIVE RELEASE AND BRAKE FOR STITCHING MACHINES

William R. Spiller and Leo D. Barley, Dayton, Ohio, assignors, by mesne assignments, to Acme Steel Company, Chicago, Ill., a corporation of Illinois Original application May 31, 1943, Serial No. 489,116, now Patent No. 2,398,053, dated April 9, 1946. Divided and this application May 4, 1945, Serial No. 591,897

7 Claims. (Cl. 192—144)

This invention relates to wire stitching machines.

It is frequently found in the use of stitching machines that instead of being able to feed the work to a machine which is mounted in a relatively fixed position on the floor, it becomes desirable to bring the machine to the work. It may be desired to move the machine with the work, or merely to be able to manipulate the machine to a definite position with respect to the work, one for example to which access would be difficult with the machines of the usual type of construction. Further, it is sometimes desirable to form and drive the stitches in an inverted position or at an angle intermediate that and the normal upright position. The machine of the present invention is made to accomplish these and other similar stitching operations, as well as being usable in the normal manner, and hence is adapted for universal application. At the same time the machine is not a mere portable or hand machine, but is arranged to be properly supported from a base, an overhead support, a swinging arm, or the like, provision being made for properly moving the machine into the desired position in either case. It is preferably supported for adjustment and ready movement and manipulation about one, two or all three axes through the use of suitable supporting mechanism. Where the clincher arm is removed the machine then becomes capable of handling material of unlimited size, moving continuously for example in any direction relative to the machine. The machine is constructed throughout for heavy duty and for performing the same character and quality of work as machines of the usual construction heretofore, and is compactly arranged and conveniently controlled to facilitate its manipulation.

It is therefore the principal object of the invention to provide a stitching machine of universal application that may be brought to operative relation with the work in any relative position of the machine and work, which is conveniently arranged and supported for ready manipulation and control on the part of the operator in all positions of use, and which is of sturdy and heavy duty construction throughout and capable of performing a completely satisfactory stitching operation.

It is a further object to provide a compact arrangement of the working parts of the machine so that it is not excessively large or cumbersome and may be readily and easily controlled and handled in the various manipulating operations, when operated either from a base or from an overhead suspension.

It is also an object to provide such a machine which is fully enclosed and protected and in which the mechanism is readily accessible and removable for adjustment or repair.

It is a further object to provide such a stitching machine incorporating a continuously running drive motor with a clutch for establishing driving connection with the operating mechanism and an adjustable brake for checking the mechanism after the operating stroke is substantially completed and in which the mechanism may likewise be rotated by hand for purposes of testing, adjusting, etc.

It is a still further object to provide such a machine on which wire reels of the same or of different width may be quickly and easily received and replaced and in which a predetermined degree of tension on the reel may be established and maintained.

In the drawings,

Fig. 1 is a view in perspective looking toward the machine from the operator's position and showing the machine in inverted position and with one type of overhead suspension;

Fig. 2 is an end elevational view from the operator's end of the machine showing a modified form of overhead suspension;

Fig. 3 is a view partially in vertical section and partially in elevation showing the operating mechanism of the machine arranged for operation in the normal position;

Fig. 4 is a view partially in elevation showing the reel and its support, and partially in vertical section on the line 4—4 of Fig. 3;

Fig. 5 is a view in vertical section on the line 5—5 of Fig. 3;

Fig. 6 is a detail view showing the means for removably securing the clincher block on the clincher arm; and Fig. 7 is a detail view looking toward the reel support in the direction of arrows 7—7 on Fig. 4.

This application is a division of copending application Serial No. 489,116 filed May 31, 1943, now Patent Number 2,398,053, issued April 9, 1946.

Referring to the drawings which illustrate a preferred embodiment of the invention, the machine is shown as being substantially completely enclosed within a housing or casing 10. The casing is enlarged at its forward end as shown at 11 to provide for receiving the stitcher head 13 therein, such stitcher head being of usual construction and not requiring further detailed description. It provides for forming and driving stitches along the line 14 as shown in Fig. 3. At its rearward part, casing 10 is provided with an extension 16 which forms a motor casing, thus completely enclosing the entire operating mechanism.

At an intermediate point substantially on the vertical plane through the center of gravity of the mechanism, a means is provided for supporting the mechanism while permitting rotation thereof about a longitudinal axis. For this purpose a ring 20 is bolted by means of bolts 21 to a flanged part 22 of the casing 10, and a cylindrical seat 23 (Fig. 3) is formed therebetween for receiving a ring-shaped split clamp 24 thereon. Such clamp is provided with oppositely facing projections 25 (Fig. 2) adjacent its split opening through which there passes bolt 26 which may be tightened to draw the clamp around its cylindrical seat and thereby securely retain the casing in fixed relation with the clamp. Upon loosening bolt 26, the mechanism may be rotated about its longitudinal axis while being supported in the clamp. This rotating action is facilitated by means of a handle 27 which is adapted to be received in a threaded aperture in the ring 20, several of such apertures being provided in spaced relation around the periphery thereof for receiving the handle in the most convenient location.

In the form shown in Fig. 1, the clamp 24 is provided with one or more raised socket portions 28 which are threaded to receive a rod 29 terminating in an upper hook member 30, to provide for suspending the entire machine from an overhead support, such as a cable, crane, or other suitable means. The provision of a plurality of such sockets 28 makes it possible to support the ring either from above, or from a pedestal or other base support, as may be desired.

In the arrangement shown in Fig. 2, the ring 24 received the ends of a yoke-shaped support 32 so that it is supported from opposite sides on pins 33, and may be suspended through the provision of the upper fitting 34, in a manner similar to that shown in Fig. 1. With this construction the mechanism may be rocked about its transverse axis on pins 33, thus affording complete freedom of manipulation in all directions.

A clincher arm 35 is provided to effect the clinching of the stitches as they are formed and driven by the stitcher head. Such arm supports the clincher block 36 which has a grooved seat 37 located in predetermined spaced relation with respect to the stitcher head, and substantially on the center line 14 of the stitch. Block 36 is dovetailed into a recess formed by a forward block 38, and a rearward block 39, both of which are held together by means of bolts 40, with the assembly being removably held on the outer end of the arm by means of additional bolts 41 fitting into rearward block 39. The bolts 40 and 41 provide for shifting the position of the clincher block laterally on the arm to establish proper operative relation with the stitcher head. It is thus possible to quickly remove and replace the clincher blocks when necessary, and in use they are securely held in fixed position upon the clincher arm.

In order to provide for adjustment in the spacing of the clincher block with respect to the stitcher head for different work therebetween, and hence to regulate the clincher action thereof, the clincher arm is adjustably supported from the casing. The bifurcated end 44 of the arm is bolted to a lever 45 by means of bolts 46 which facilitate the assembly of the machine, and removal and replacement of the clincher arm. Lever 45 is pivotally mounted upon the casing on pivot pin 48 which as will be seen from Fig. 3 is positioned relatively close to the plane of the supporting ring 24.

Lever 45 projects from its pivot at 48 adjacent one side of the casing, across to the opposite side thereof, and in order to avoid interference with the drive mechanism which is contained within the central part of the casing, it is made in the form of a hollow annular yoke as shown at 50. At its upper end, adjacent the opposite side of the casing, it is formed with a bearing recess 51 within which there engages the end of an adjusting rod 52 which extends parallel with the wall of the casing and within a web part thereof shown at 53 forming a chamber 54.

Within chamber 54 there is positioned a coiled relief spring 55 which bears at one end against and prevents rotation of a nut 56 which threadedly engages the rod 52. At its other end the spring 55 bears against nut 57 adjustably threaded into the wall of the casing so that the initial compression or preloading of the spring can be adjusted. Rod 52 passes freely through the inwardly extending wall of the chamber and is likewise freely movable through nut 57. At its end it is keyed to a disc 58 which extends outwardly through an aperture in the casing so that its outer periphery is accessible for manual adjustment, such adjustment providing for rotation of the rod and the axial travel thereof resulting from its threaded relation with nut 56.

In operation, to provide for adjusting the position of the clincher, disc 58 is manually rotated and this in turn results in rod 52 effecting the pivoting movement of lever 45 and of clincher arm 35, by direct adjusting contact therewith. A spring 59 provides for keeping the lever 45 against the end of rod 52 when the latter is backed off, but it will be noted that adjustment of the clincher arm in either direction takes place independently of relief spring 55, thus affording positive and accurate setting of the position of the clincher arm.

Where however such abnormal resistance is encountered during operation as to produce an excessive thrust upon the clincher arm, such as might cause damage to the machine, such excess load is transmitted through lever 45 into rod 52 and against nut 56. Upon the load exceeding the predetermined value for which the relief spring has been adjusted by means of the setting of nut 57, nut 56 will then move to effect compression of the spring beyond that point, thereby relieving the clincher arm and avoiding damage to the machine.

It will be noted that the spring 55 is located in a position where it does not interfere with the remaining part of the mechanism, and that further both the spring 55 and the adjusting mechanism for determining the position of the clincher arm are preferably located as far removed from the pivot axis 48 as conveniently possible. As a result, therefore, the forces developed on the adjusting and relief mechanism are reduced to the minimum, and the adjusting movements effected by the setting of rod 52 can be more accurately predetermined and thereafter accurately maintained in operation and use, avoiding too great sensitivity in adjustment.

The motor is formed with a forwardly extending drive shaft 62 to which is keyed the drive collar 63, and if desired may incorporate a suitable gear reduction mechanism within its housing. Bolted to the collar by means of bolts 64 is a drive disc 65 which is connected to a driven disc 66 by means of an annular body of resilient material 67 such as rubber or the like. The use of such flexible coupling has been found in some cases not to be necessary, and in such event the drive collar is connected directly to the driven collar; but where some additional flexibility and drive is desired, the construction as shown has been found to give satisfactory results.

The driven disc 66 is threaded on to clutch plate 70 which has clutch teeth 71 adapted to be engaged by a clutch pin 72. The clutch pin is received within a recess in hub 73 and is keyed to the driven shaft 74 by key 72a. Clutch pin 72 is yieldably urged toward engaging position with clutch teeth 71 by means of spring 75 and it is withdrawn from operative position to effect disconnection of the driving engagement by means of a clutch cam 76 the upper portion of which is riveted to a lower part 76a, the latter being guided in a slot in a guide member 77 extending inwardly into and attached to the outside of the casing by means of bolts 78. The driven shaft 74 is directly connected with the cam disc 74a of the stitcher head through the drive pin 74b.

Guide 77 is formed at one side with a projection which serves as a pivot 79 for a clutch actuating lever 80. Lever 80 extends transversely of the driven shaft 74 and in order to provide for the proper and compact relationship of the operating parts, is made to pass directly through an aperture 81 in the clutch cam 76. Thus as shown at Fig. 5 one arm of the lever extends through this aperture which is suitably contoured as shown to permit of the necessary rocking movement of the lever, connection being made at one side of the shaft with a spring 83 suitably supported from a fixed position within the casing which tends to advance the clutch cam into engaging position. At the opposite side of the casing there is positioned the solenoid 85 which has a link 86 carrying a pin 87 engageable in slot 88 of the other arm of the lever for actuation thereof against the action of spring 83 and in a direction to effect withdrawal of the clutch cam from its operative position. Access to the interior of the casing is afforded at opposite sides immediately opposite the solenoid 85 and micro-switch 92, providing for removal and replacement thereof respectively by removable access plates 89.

The hub 73 is formed with a cam track 90 against which there operates a follower 91 (Fig. 5) controlling the actuation of a micro-switch 92 supported from the inner wall of the casing substantially opposite solenoid 85. This combination of clutch actuating cam, solenoid, and micro-switch provides for the actuation of the mechanism, in response to manual tripping by the operator, to connect the continuously running motor to cause the driving of the stitch forming mechanism through one revolution producing one cycle of operation, and to prevent repeat cycles until the mechanism has been again tripped by the positive action of the operator. The micro-switch is connected in the energizing circuit of solenoid 85 and the arrangement of the cam surface is such that upon tripping of the manual control, the contacts of the micro-switch are closed and the solenoid is thus energized. Upon energization, the solenoid effects withdrawal of clutch cam 76 to allow clutch pin 72 to engage clutch teeth 71, thus establishing a driving connection for the rotation of hub 73 and the stitcher head, to form and drive a stitch. As the hub nears the end of a revolution, the cam 90 acts to open the contacts of the micro-switch, deenergizing solenoid 85 and allowing spring 83 to raise clutch cam 76 to effect withdrawal of clutch pin 72, disconnecting the drive and preventing a second or repeat operation. Preferably the mechanism is constructed and operated in accordance with that shown in copending patent of John F. Haunty, No. 2,324,080, assigned to the same assignee as this application.

In order to check the roatation of the mechanism upon the completion of such cycle of operation, and to assure that the parts will be stopped after each cycle in a proper and predetermined position in preparation for a subsequent cycle of operation, a brake means is provided. This includes a braking drum 95 formed on hub 73 eccentrically thereof. A brake band 96 of suitable frictional material is adapted to engage the drum over approximately half the periphery thereof, the eccentricity of the drum being so related and arranged that it produces a substantially maximum extension of the brake band and hence maximum frictional drag as the stroke of operation nears completion.

One end of the band 96 is fixedly attached to a stud 97 the upper end of which is threaded to receive a nut 98, the stud being freely withdrawable through a fixed part of the casing and the nut 98 being accessible from the outside of the casing. A compression spring 99 tends to normally retain the stud in its inner position where the pull of the brake band is made effective directly against nut 98. In this position the nut is so prevented from rotating because of its contact with the enclosing portions 100 of the casing. However when the stud is manually withdrawn to relieve the nut, it may then be rotated and adjusted to determine the limiting position which the stud will occupy when restored to its operative position.

At its opposite end, the band 96 is connected to a plate 102 to the upper end of which there is connected a resilient spring 103 which thus normally tends to lift the plate and hence to tighten the band on the frictional drum. The plate 102 (Fig. 3) has an enlarged aperture 104 therein which fits over the end 105 of a fixed stud 106, thus permitting only a limited tightening movement of the band. From this it will be evident that after the spring 103 has lifted the band to the limit determined by the clearance of the stud end 105 in aperture 104, further lifting of the band is prevented, and hence the force of the spring 103 is no longer effective to continue to tighten the band against the drum. This is found especially desirable with the construction of eccentric drum as shown and described, since it provides for predetermining the tension of the spring 103 to give the desired degree of braking action when the high point of the eccentric stretches the band, but provides for quick and substantially complete release of further spring pressure and hence of further frictional drag, when the low point of the cam is opposite the band. Thus the drag is not continued throughout the entire working stroke while the low part of the drum is opposed to the band but is relieved to avoid loss of power and unnecessary wear on the band when the braking action is not desired.

A plurality of lubricating channels 108 extend from different parts of the casing inwardly toward the bearings and interior mechanism, such channels being closed by spring pressed ball checks 109. The device may thus be properly lubricated regardless of the position in which it is supported.

Adjacent the motor end of casing 16 a plate 110 is secured by means of a series of bolts 111, such plate carrying as an integral part thereof a hand grip 112. Such hand grip also incorporates the trigger 113 which provides for the control of the tripping of the mechanism, which is thus made convenient for the operator while he is holding and manipulating the machine to its proper position. Suitable electrical connections are made from the trigger 113 to the solenoid for the control thereof as described in said patent of John F. Haunty. The motor may be placed in operation through the operation of the auxiliary control switch 114.

Since the present device is adapted for operation in different positions of adjustment about the longitudinal axis of the machine, the plate 110 is symmetrically arranged so that it can be secured upon the end of the motor casing in any one of a number of different positions, four such positions being available with the particular arrangement shown, to thus place the hand grip 112 in the most convenient position for use by the operator regardless of the position of adjustment of the machine itself.

It is sometimes found desirable to produce manual operation of the mechanism, such as for the purpose of adjusting the various parts of the stitcher or clincher mechanism, and in the present case with the mechanism substantially entirely enclosed, it is necessary to provide some means for this purpose. Accordingly, a hand wheel 120 having suitable grooves therein to permit of its being properly gripped by the operator, is mounted coaxial with the motor shaft, and is arranged with a clutch 121 (Fig. 3) which may be moved inwardly in an axial direction to effect engagement with the motor shaft, thereby securing direct rotation of the shaft of the motor. Spring means 122 normally maintains the hand wheel out of driving engagement with the motor shaft. Also to permit of tripping the clutch operation and thus effectively rotating the entire mechanism from the hand wheel 120, an aperture 123 is provided in the casing in line with lever 89, and by inserting a suitable tool through aperture 123 to engage the arm of the lever and withdraw clutch cam 76 against the action of spring 83, the clutch is engaged and the entire operation can then be carried out by rotation of hand wheel 120.

With a machine of the present construction it becomes necessary to replace the reel containing the wire which is fed to the mechanism more or less frequently and it is desirable to be able to do so rapidly and easily and without altering the tension or drag which is applied to the reel after the machine has been properly adjusted. For this purpose a stud 130 projects outwardly from the casing on which is rotatably mounted a dished reel engaging member 131, the dished central part thereof providing clearance to receive the usual nut on the outer face of the reel itself, and the outer part being formed with a plurality of outwardly directed flanged fingers 132 bearing against the face of the spool 133 well outwardly of the axis thereof. The member 131 is urged against the face of the spool by spring 134 which bears against a friction surface 135 thereof, such movement on stud 130 being limited by means of collar 136 thereon.

A similar dished engaging member 138 is rotatably mounted in a socket 139 formed in bracket 140, pin 141 carried by the bracket having a flange 142 thereon retaining the parts in assembled relation. Member 138, like member 131, engages the side face of the spool and is rotated therewith as the wire is withdrawn by the operation of the machine, the desired frictional drag force being developed at the relatively moving surfaces where member 138 is supported in its socket 139.

Bracket 140 is adjustably supported by arm 144 which has an elongated slot 145 therein through which there projects the screws 146 secured to the end of the bracket. By loosening the screws, the bracket may be moved on the arm and the support thus adapted for receiving reels of different width. Arm 144 is pivotally mounted on pin 148 carried by a part of the casing, and on the extended part 149 thereof carries a latch plunger 150, urged by spring 151 to latching engagement with fixed abutment 152. The latch may be manually withdrawn by means of handle part 153 to release the plunger and to thereby provide for the swinging of the arm and the bracket to a release position where the reel may be removed and replaced on stud 130. With the construction as disclosed, neither this operation nor the resetting of the support for a reel of different width necessitates any change in the frictional drag imposed on the unwinding of the reel.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In a stitching machine of the character described the combination of a casing adapted to receive therein a stitching mechanism operable through a cycle of movement, a drive shaft for said mechanism rotatable through one revolution to produce a said cycle of movement, an eccentric friction drum rotatable with said drive shaft, a friction band frictionally engaging the periphery of said drum for checking rotation thereof toward the end of each revolution as the raised portion of said drum moves under said band, means for supporting one end of said band in a predetermined adjusted position, a yieldable support for the opposite end of said band tending to tighten the band against said drum only near the end of each revolution of said shaft, and means for limiting the travel of said yieldably supported end of the band to provide rapid and substantially complete release of the pressure on said band after a predetermined limited travel thereof when the low portion of said drum moves under the band to maintain substantially free rotation of said drive shaft during the major part of each cycle of movement.

2. In a stitching machine of the character described the combination of a casing adapted to receive therein a stitching mechanism operable through a cycle of movement, a drive shaft for said mechanism rotatable through one revolution to produce a said cycle of movement, an eccentric friction drum rotatable with said drive shaft, a friction band frictionally engaging the periphery of said drum for checking rotation thereof toward the end of a revolution as the raised portion of said drum moves under said band, means for supporting one end of said band in a predetermined adjusted position, a yieldable support for the opposite end of said band tending to tighten the band against said drum, means for limiting the travel of said yieldably supported end of the band to provide rapid and substantially complete release of the pressure on said band after a predetermined limited travel thereof when the low portion of said drum moves under the band, and means accessible from outside said casing for adjusting the initial tension on said band.

3. In a stitching machine of the character described the combination of a casing adapted to receive therein a stitching mechanism, a drive shaft for said mechanism, an eccentric friction drum rotatable with said drive shaft, a friction band engaging a portion of the periphery of said drum for checking rotation thereof when in contact with the raised portion thereof, a stud connected to one end of said band and movable through and extending to the outside of said casing, means for limiting and predetermining the inward movement of said stud to a predetermined position, a yieldable member engaging the other end of said band for urging the same into frictional contact with the drum, and means for limiting the action of said yieldable means to check and quickly remove the braking action after the raised portion of said drum has traveled out of contact with said band.

4. A stitching machine of the character described the combination of a casing adapted to receive therein a stitching mechanism operable through a cycle of movement, a drive shaft for said mechanism rotatable through one revolution to produce a said cycle of movement, clutch means for effecting driving engagement of said drive shaft, means actuated upon substantial completion of said cycle of movement for effecting disengagement of said clutch means, a friction drum rotatable with said drive shaft, a friction band frictionally engaging the periphery of said drum for checking rotation thereof toward the end of a revolution following disengagement of said clutch, and means for controlling the application of said band to effect stopping of said drive shaft upon completion of said cycle of movement while maintaining substantially free rotation of said shaft during the major part of rotation thereof.

5. In a stitching machine of the character described the combination of a casing adapted to receive therein a stitching mechanism operable through a cycle of movement, a drive shaft for said mechanism rotatable through one revolution to produce a said cycle of movement, clutch means for effecting driving engagement of said drive shaft, means actuated upon substantial completion of said cycle of movement for effecting disengagement of said clutch means, a friction drum rotatable with said drive shaft, a friction band frictionally engaging the periphery of said drum for stopping rotation thereof toward the end of a revolution following disengagement of said clutch, yieldable means for controlling said engagement of said band as said cycle of movement is substantially completed to stop further rotation of said drive shaft at the end of each revolution, and abutment means for restricting the action of said yieldable means providing for quick release of the braking action to maintain substantially free rotation of said drive shaft during the major part of rotation thereof.

6. In a stitching machine of the character described the combination of a casing adapted to receive therein a stitching mechanism operable through a cycle of movement, a drive shaft for said mechanism rotatable through one revolution to produce a said cycle of movement, clutch means for effecting driving engagement of said drive shaft, means actuated upon substantial completion of said cycle of movement for effecting disengagement of said clutch means, an eccentric friction drum rotatable with said drive shaft, a friction band frictionally engaging the periphery of said drum for stopping rotation thereof as the high portion of said drum moves opposite said band toward the end of a revolution following disengagement of said clutch, yieldable means for effecting said engagement of said brake as said cycle of movement is substantially completed to stop further rotation, and means for restricting the action of said yieldable means as the low portion of said drum moves opposite said band providing for quick release of the braking action.

7. In a clutching mechanism of the character described having a casing, the combination of transmission mechanism located substantially centrally of said casing, a drive shaft, a clutch member for establishing a driving relation with said drive shaft, a clutch control member operatively connected to provide for withdrawal of said clutch member from driving relation with said drive shaft, a solenoid operatively connected to said clutch control member to provide for engagement of said clutch to said drive shaft to drive through one revolution producing one cycle of operation when said solenoid is energized, said solenoid being located within said casing at one side of said transmission mechanism, a switch connected to provide for deenergizing said solenoid near the end of each revolution producing said one cycle of operation and thereby controlling the disengagement of said clutch and limiting the operation to one cycle, said switch being located within said casing at the opposite side of said transmission mechanism, and removable cover means carried by said casing adjacent said solenoid and said switch providing for free access to and removal thereof.

WILLIAM R. SPILLER.
LEO D. BARLEY.

REFERENCES CITED

The following references are of record in the file of this patent:

UNITED STATES PATENTS

| Number | Name | Date |
|---|---|---|
| 460,058 | Luehrs | Sept. 22, 1891 |
| 951,084 | Talbot | Mar. 1, 1910 |
| 1,815,152 | Klotz | July 21, 1931 |
| 1,855,178 | Bliss et al. | Apr. 26, 1932 |
| 1,893,427 | McDonald | Jan. 3, 1933 |
| 1,984,908 | Wissman | Dec. 18, 1934 |
| 1,993,413 | Mellon | Mar. 5, 1935 |
| 2,085,442 | Newell | June 29, 1937 |
| 2,191,983 | Double et al. | Feb. 27, 1940 |
| 2,210,227 | Williamson | Aug. 6, 1940 |
| 2,304,952 | Peterkin, Jr., et al. | Dec. 15, 1942 |
| 2,324,080 | Haunty | July 13, 1943 |
| 2,325,102 | Boschen | July 27, 1943 |

FOREIGN PATENTS

| Number | Country | Date |
|---|---|---|
| 255,019 | Great Britain | June 2, 1927 |
| 349,565 | Germany | Mar. 6, 1922 |